United States Patent
Nagpal et al.

(10) Patent No.: US 9,906,914 B2
(45) Date of Patent: Feb. 27, 2018

(54) SCALABLE INDOOR NAVIGATION AND POSITIONING SYSTEMS AND METHODS

(71) Applicants: Paramvir Singh Nagpal, Richmond Hill (CA); Sean Huberman, Guelph (CA); Saeedeh Hamidifar, Richmond Hill (CA)

(72) Inventors: Paramvir Singh Nagpal, Richmond Hill (CA); Sean Huberman, Guelph (CA); Saeedeh Hamidifar, Richmond Hill (CA)

(73) Assignee: MAPSTED CORP., Markham, Ontario (CA)

( * ) Notice: Subject to any disclaimer, the term of this patent is extended or adjusted under 35 U.S.C. 154(b) by 0 days.

(21) Appl. No.: 15/481,118

(22) Filed: Apr. 6, 2017

(65) Prior Publication Data

US 2017/0332203 A1    Nov. 16, 2017

Related U.S. Application Data

(60) Provisional application No. 62/391,771, filed on May 11, 2016.

(51) Int. Cl.
| | | |
|---|---|---|
| *H04W 24/00* | (2009.01) | |
| *H04W 4/02* | (2018.01) | |
| *H04W 4/04* | (2009.01) | |

(52) U.S. Cl.
CPC ............ *H04W 4/028* (2013.01); *H04W 4/043* (2013.01)

(58) Field of Classification Search
CPC . H04W 12/06; H04W 12/08; H04W 36/0005; H04W 48/02; H04W 4/003; H04W 4/12; H04W 76/021; H04W 4/02

USPC ........ 455/456.1, 417, 456.3, 41.2, 457, 403, 455/456.5

See application file for complete search history.

(56) References Cited

U.S. PATENT DOCUMENTS

| | | | | |
|---|---|---|---|---|
| 2011/0178701 A1* | 7/2011 | Gupta | ..................... | G01C 21/20 701/465 |
| 2013/0179075 A1* | 7/2013 | Haverinen | ............. | G01C 21/08 701/525 |
| 2014/0031092 A1* | 1/2014 | Hohteri | .................. | G06F 1/3231 455/574 |
| 2014/0070942 A1* | 3/2014 | Haase | ..................... | G08B 21/02 340/532 |
| 2014/0094136 A1* | 4/2014 | Huang | ..................... | H04W 4/02 455/404.2 |
| 2014/0113652 A1* | 4/2014 | Maguire | ............... | G01S 5/0289 455/456.1 |
| 2014/0274114 A1* | 9/2014 | Rowitch | .................. | G01S 19/46 455/456.1 |
| 2014/0306833 A1* | 10/2014 | Ricci | ....................... | B60Q 1/00 340/901 |

(Continued)

*Primary Examiner* — Joseph Arevalo
(74) *Attorney, Agent, or Firm* — Henry L. Ohab

(57) ABSTRACT

Embodiments of the present disclosure related to methods and systems of determining the position of a device in indoor space. A map importing module takes a floor map of an indoor space and processes it for further use. A calibration module creates a fingerprint map of the indoor space described by the floor map. A positioning module uses the calibration data embodied in a fingerprint map as well as device signal and sensor readings in order to estimate a trajectory for the device, then position the device within the indoor space described by the floor map using a probability density function.

16 Claims, 5 Drawing Sheets

(56) References Cited

U.S. PATENT DOCUMENTS

| | | | | |
|---|---|---|---|---|
| 2014/0343846 | A1* | 11/2014 | Goldman | G05D 1/0272 |
| | | | | 701/525 |
| 2015/0362581 | A1* | 12/2015 | Friedman | G01S 13/767 |
| | | | | 455/456.1 |
| 2016/0379074 | A1* | 12/2016 | Nielsen | G06K 9/3241 |
| | | | | 348/143 |
| 2017/0038787 | A1* | 2/2017 | Baker | H05B 37/0272 |
| 2017/0061171 | A1* | 3/2017 | Lombardi | G06K 7/10019 |

* cited by examiner

SCALABLE INDOOR NAVIGATION AND POSITIONING SYSTEMS AND METHODS

CROSS-REFERENCE TO RELATED APPLICATIONS

This application claims the benefit of U.S. Provisional Application No. 62/391,771 filed May 11, 2016.

BACKGROUND OF THE INVENTION

Location based services are rapidly expanding. Outdoor location technologies are mainly based on GPS (Global Positioning System) technologies. GPS cannot perform properly indoors and is therefore inadequate. As a result, indoor location systems are starting to appear on the market.

The need for a system arises from various market segments and applications. One example in the market is the GPS based systems that use integrated positioning and navigation systems based on GPS receivers as the primary positioning technology. However, the fact that uninterrupted satellite reception is not possible in many locations is a major limitation of many GPS based systems. In particular, indoor areas such as shopping malls and departments stores feature environments where GPS signals suffer from losses due to walls, roofs, possible multiple floors, and other obstructions which significantly degrade the signal and cause the GPS signal to be accurate to within approximately 30-50 meters. This level of accuracy is too imprecise for certain applications where sub-meter precision in positioning is required, such as navigating a user to a particular shop or kiosk within a mall.

Many currently available indoor positioning systems attempt to solve this problem by means of wireless beacons that emit a BlueTooth signal. Positioning is then typically determined by calculating the distance from each beacon and using triangulation to estimate a location. However, beacons can be time consuming and costly to deploy and maintain, and their performance can degrade as their batteries wear out.

Therefore, there exists a need for a cost effective and scalable solution that does not rely on hardware installation and that maintains high performance and precision indoors.

BRIEF SUMMARY OF THE INVENTION

Embodiments of the present disclosure relate to methods and systems of positioning and navigation for computing devices in an indoor space. A method is provided wherein device signal data is gathered, device sensor data is gathered, one or more estimated trajectories are determined based on the device signal data, the device sensor data, and a fingerprint map, and the position of the device is determined based on a data fusion of the one or more estimated trajectories.

A system is also provided, including a memory, a processor, and a module stored in memory, that, when executed by the processor, determines the position of the device by performing the steps of gathering device signal data, gathering device sensor data, determining one or more estimated trajectories based on the device signal data, the device sensor data, and a fingerprint map, and determining the position of the device based on a data fusion of the one or more estimated trajectories.

A computer readable medium is also provided.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
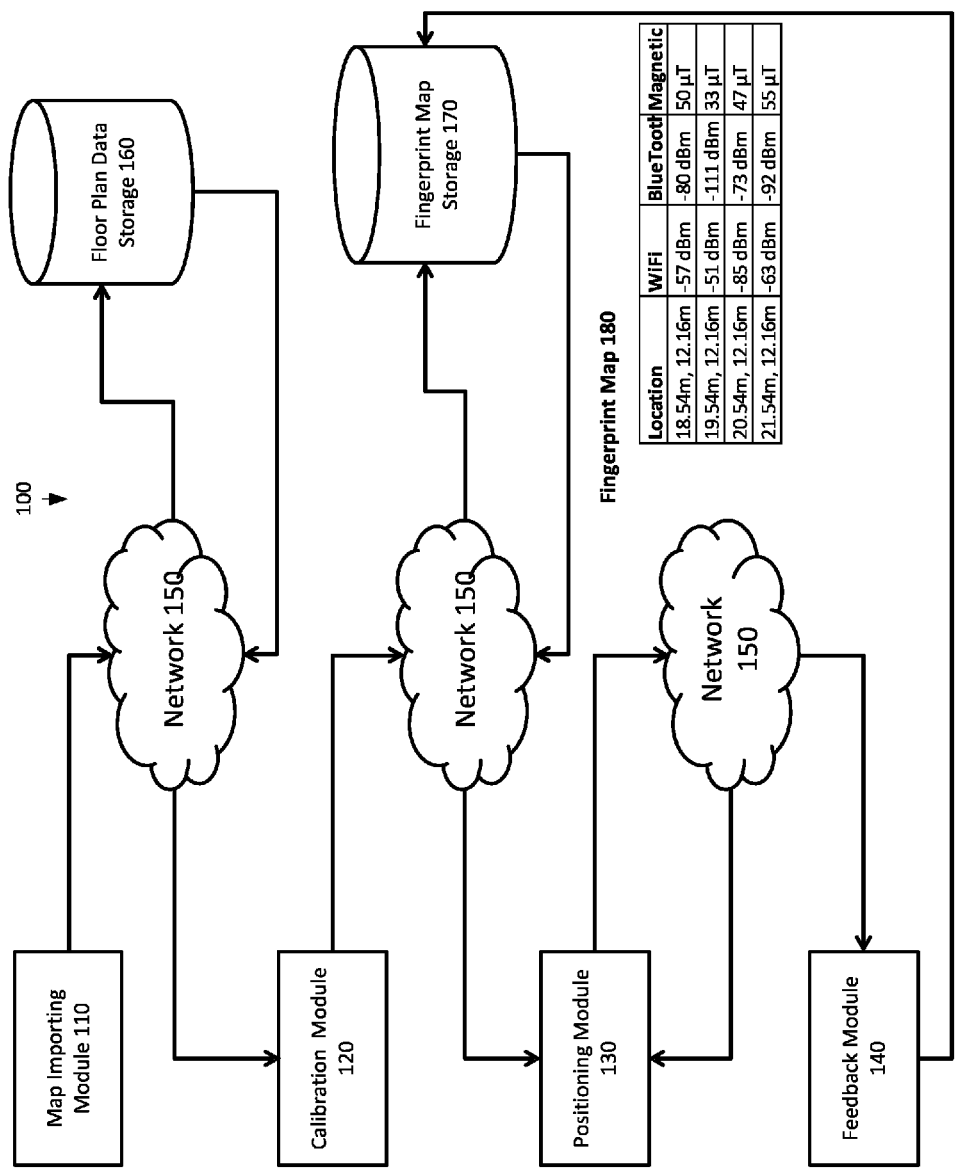
FIG. 1 is a block diagram depicting an indoor navigation system according to an embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

FIG. 1 depicts a block diagram of a system 100 according to an embodiment of the present disclosure. Further provided are map importing module 110, calibration module 120, positioning module 130, and feedback module 140. Modules 110, 120, 130, 140 can be implemented as software modules running on a hardware platform, or else as standalone applications running on the hardware platform. The hardware platform can be constructed as a physical desktop, a physical laptop, an embedded processor, a mobile processing platform, a physical server system, or any other computing platform comprising a processor, random access memory, and permanent storage. Modules 110, 120, 130, 140 are further operatively coupled to floor plan data storage 160 and fingerprint map storage 170, by means of a network 150 or alternatively by means of a traditional system bus.

Further shown in FIG. 1 is a sample fingerprint map 180, which may be stored on fingerprint map storage 170. In one embodiment, fingerprint map 180 comprises a table wherein the entries are indexed by location, and for each location there is a set of associated measurements. For example, fingerprint map 180 can comprise a set of location/value pairs, with values for Wi-Fi signal strength, Bluetooth signal strength, and magnetic field, or any other signal or environmental variable that can be measured by the phone, such as barometric pressure. The values associated with a particular fingerprint location can be measured directly or estimated by interpolation or extrapolation. In other embodiments, fingerprint map 180 can be implemented as a database, a hashtable, or any other suitable data structure.

Figure 2:
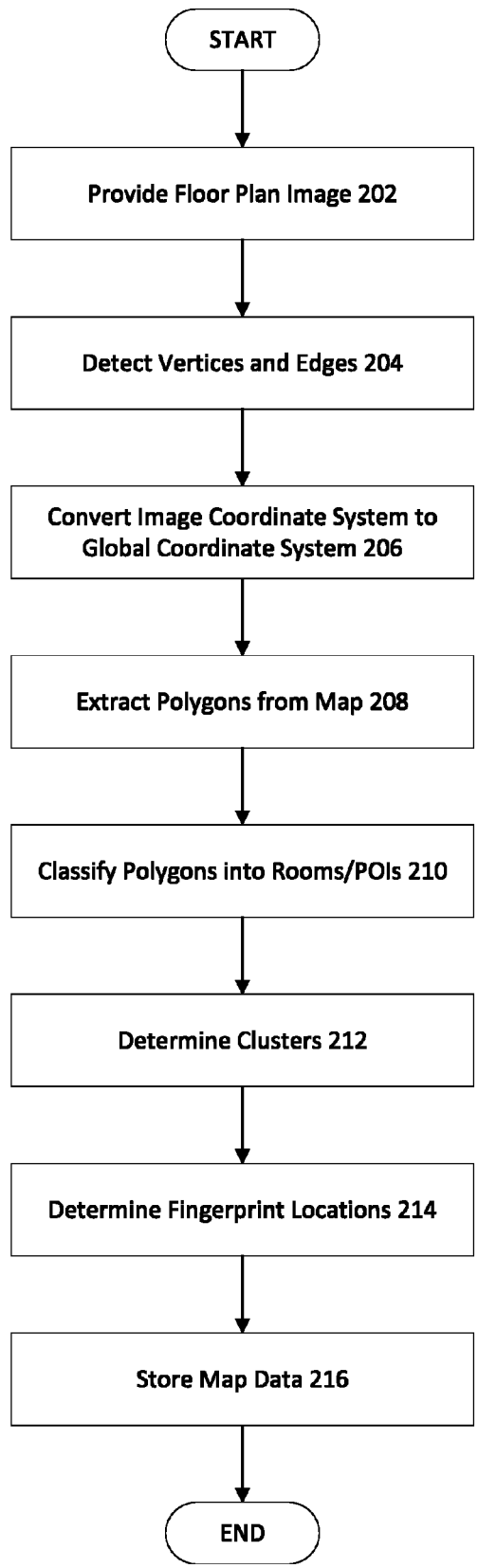
FIG. 2 is a flow diagram depicting a map importing module of an indoor navigation system, according to an embodiment.

FIG. 2 depicts a flow diagram describing the functioning of map importing module 110, according to an embodiment. The map importing module 110 is configured to receive as input a floor plan of an indoor space, process the floor plan, and extract all potential relevant elements such as the of walls, rooms, stairs, elevators and other points of interests, as well as the precise coordinates of each element. The input to the map importing module 110 can be provided in any suitable electronic format, for example and without limitation, PDF, TIFF, CAD, or JPG. In some embodiments, map importing module 110 can also determine the labels of particular areas on a given floor plan, such as the name of a shop or the point of interest such as an exit staircase or an elevator. For example, if the floor plan depicts a shopping mall, the map importing module 110 can determine the names of the stores in the mall.

At step 202, a floor plan image is provided to the importing module. For example, the floor plan image can be a scanned or electronic copy of the blueprint of the floor plan of a particular indoor space such as a shopping mall or an airport.

At step 204, the floor plan image is processed and a complete set of vertices and edges is obtained. In one embodiment, map importing module 110 detects all vertices in the floor plan image, then follows the connections between the vertices to determine edges. In one embodiment, the floor plan image is first converted to a black and white image to aid in detection of vertices and edges. In some embodiments, a cleanup algorithm can be applied to remove any misidentified vertices or edges, and to ensure no vertices or edges were double counted.

At step 206, the coordinate system of the floor plan image is converted to a global coordinate system. In one embodiment, the image coordinate system given in pixel dimensions can be converted to global latitude and longitude, or Mercator coordinates, such that where a particular location on the floor plan image is given as (x,y), that location is expressed in terms of the Universal Transverse Mercator coordinate system. The conversion to a global coordinate system ensures that the coordinates on a floor plan map correspond to real-life locations.

At step 208, the floor plan map is processed to extract a complete set of polygons. A polygon is a region of the map bounded by a set of edges. For example, a polygon on the floor plan map can correspond to a room or a point of interest such as an elevator or a staircase. In one embodiment, polygons are extracted from the map utilizing graph theory to traverse the complete set of vertices and edges. Each polygon can specify a room or a hallway, and each edge can represent a wall.

At step 210, each of the polygons extracted at step 208 are classified into rooms, points of interest, or other classification categories that correspond to real-world features of the area covered by the floor plan map. Step 210 can be performed using, for example, machine learning, to examine the processed floor map image and determine the classification of each polygon. For example, polygon classification can be performed using Support Vector Machines, Speeded-Up Robust Features, Histograms of Orientated Gradients or any other suitable image matching machine learning process.

At step 212, one or more clusters are determined from the set of polygons. Clusters can describe sub-regions or portions of a polygon, for example if a polygon is very large and is subdivided into smaller, more manageable portions. For example, a very long hallway such as may commonly be found in a shopping mall may appear on the floor plan map as one large polygon, so for purposes of simplification it is divided into clusters of a suitable size.

At step 214, a set of fingerprint locations are determined. For example, fingerprint locations can be located in the most likely places for a user to traverse on a given floor plan map. In one embodiments, fingerprint locations can be placed along likely walking routes. For example, fingerprint locations can be distributed at even intervals throughout the floor plan map.

At step 216, the map data and coordinates produced in steps 202-214 are stored in coordinate storage 160. In some embodiments, floor plan storage 160 is implemented as a remote server accessible via network connection. In other embodiments, step 216 may be delayed if there is no network access to floor plan data storage 160 or if it would be time consuming to copy the files.

Figure 3:
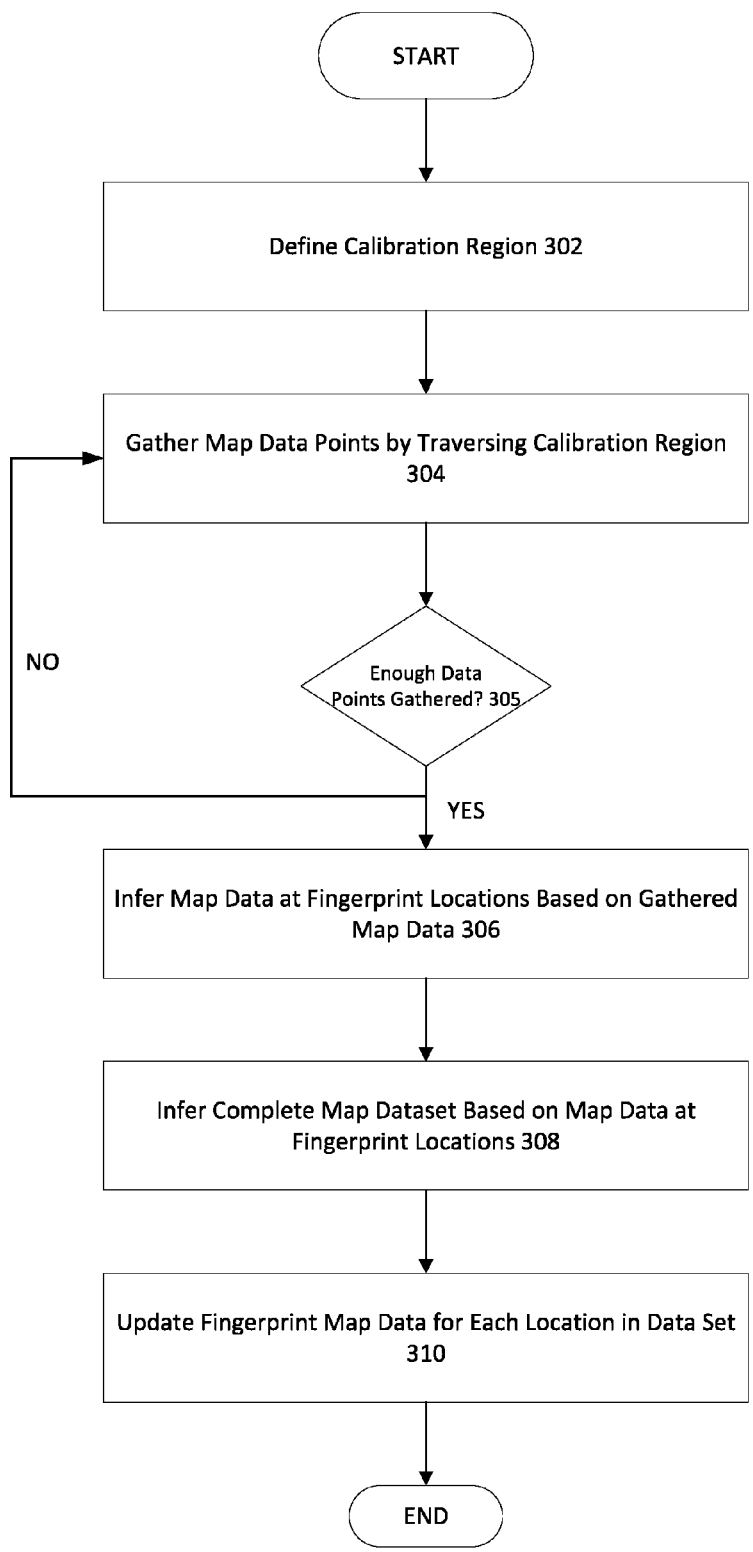
FIG. 3 is a flow diagram depicting a calibration module of an indoor navigation system, according to an embodiment.

FIG. 3 depicts a flow diagram 300 describing the functioning of calibration module 120, according to an embodiment. Calibration module 120 "maps" the indoor space for use by positioning module 130.

At step 302, a calibration region is defined, describing a portion of the floor plan map which has been pre-processed as described in FIG. 2 and the accompanying description above. In some embodiments, the calibration region can be determined automatically by subdividing the area map into sub-regions of suitable size to ensure a sufficient number of data points is collected in a given time period. In other embodiments the calibration region can be defined manually by a user based on the floor map of the indoor space.

At step 304, a data points are gathered by a user carrying a device running calibration module 120 and traversing the calibration region defined at step 302. As the user holding the device moves about the calibration region, the calibration module 120 records readings of various signal and sensor measurements available to the device. For example, measurements can be taken at regular intervals, or each time the device changes location. In one embodiment, map data points are gathered with a calibration app running on a mobile device, or a calibration mode within a mapping app running on a mobile device.

At step 305, a determination is made by the calibration module 120 as to whether a sufficient number of data points has been gathered at step 304. For example, the calibration module 120 can require a minimum number of total traversals of the calibration region, or it can compare the number of data points gathered to a pre-defined value, or it can compute the average value for a group of data points and compare it to a previously computed average and gathering more data points if the difference between the two is too great. In some embodiments, each calibration region is classified into one of three categories based on the sufficiency of the gathered data for example, regions can be classified as either well-calibrated, moderately calibrated, or insufficiently calibrated. Based on the information gathered, calibration module 102 can determine whether to proceed to step 306 or re-do step 304.

At step 306, map data is inferred for each fingerprint location, based on the map data gathered at the locations traversed at step 304. Fingerprint location data can be estimated using extrapolation and interpolation from the data gathered at the locations traversed by the calibration user. For example, the fingerprint location data can be estimated using an average of the signals of the neighboring traversed locations.

At step 308, map data for each possible location in the floor map is inferred based on the fingerprint location data derived at step 306, thus deriving a complete data set for a given floor plan, that is, an estimate of the sensor and signal data at each possible location on the floor map. In one embodiment, the complete data set is inferred using an Artificial Neural Network (ANN) where the location data comprises at least the mean and variance of the signal strength at a given location. In other embodiments, the fingerprint location data is inferred using a Generalized Regression Neural Network (GRNN), a Multilayer Perceptron, a Multi-Dimensional Function Approximation, a Feed-Forward Neural Network, or any other suitable type of machine learning algorithm.

At step 310, maps in fingerprint map storage 170 are updated with the new fingerprint location data obtained at step 308.

Once an indoor space has been calibrated as depicted in FIGS. 2 and 3, it is possible to determine a location for a device within that indoor space based on data collected by the device in real-time for use with positioning module 130, as explained further below.

Figure 4:
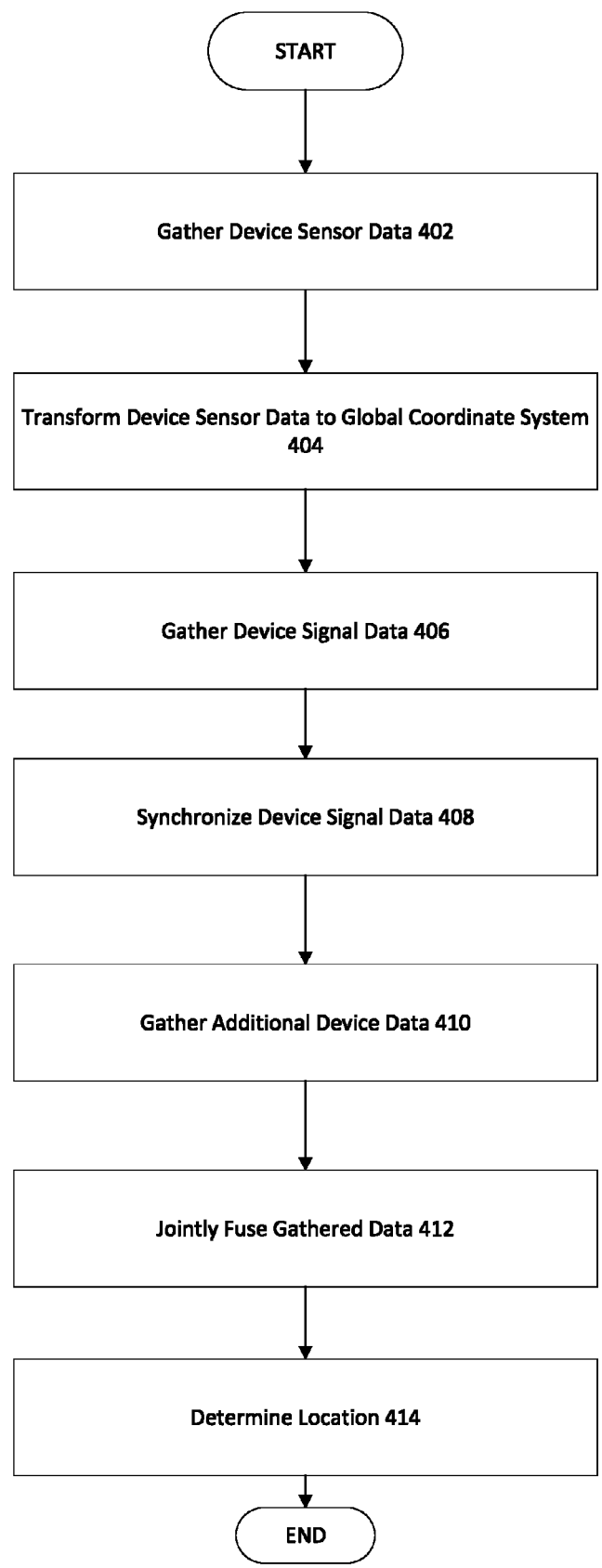
FIG. 4 is a flow diagram depicting a positioning module of an indoor navigation system, according to an embodiment.

FIG. 4 depicts a flow diagram 400 describing the functioning of positioning module 130, according to an embodiment. Positioning module 130 can run as a process within an application or, alternatively, as a standalone application on a hardware platform as described above in FIG. 1 and the associated description. In some embodiments, positioning process 400 can operate in semi-centralized mode, wherein the data collected is first pre-processed on the device, then transmitted to a remote server for further processing. In other embodiments, positioning module 130 can operate in distributed mode, wherein all of the data collected is processed on the device or hardware platform on which the positioning module 130 is configured to execute. The positioning module 130 operating in distributed mode may still receive updates from the server (e.g., parameter tunings); however, the core positioning is performed entirely on the device side. Distributed mode operation is especially advantageous in environments with low connectivity, for example, spaces without Wi-Fi signals or in spaces where there are cellular dead spots.

At step 402, positioning module 130 gathers device sensor data. For example, device sensor data can include accelerometer information, atmospheric pressure information, gyroscope information, magnetometer information, and any other sensor data available to the device.

At step 404, the device sensor data is converted to the global coordinate system. For example, a mobile device can be oriented in any number of ways in the user's hand. For the sensor data obtained at step 402 to be useful in an indoor positioning sense it should first be converted to a global coordinate system. In one embodiment, device orientation can be accomplished using a self-adapting Kalman filter which fuses the various sensor data (for example, accelerometer, gyroscope, and magnetometer data). In one embodiment, the Kalman filter monitors the bias and drift of the various sensors and incorporates the misalignment matrices, allowing for the device to self-calibrate, improving the accuracy over time.

At step 406, device signal data is gathered by the positioning module 130. For example, device signal data can include Wi-Fi signals, Bluetooth signals, cellular signals, and any other signal data available to and measurable by the device.

At step 408, the device signal data and the device sensor data are synchronized. Different devices and operating systems may gather certain data at different intervals. Additionally, even the same device can gather different types of data at different intervals. For example, some devices record Wi-Fi signal readings at intervals of 4 second, whereas others record Wi-Fi signal readings at intervals of 100 milliseconds.

At step 410, additional device data is gathered. For example, additional device data may include step information or heading information. In one embodiment, step information can be inferred from device sensor data. In one embodiment, a dynamic feedback algorithm can adjust to a person's walking style and pace by examining the person's walking patterns and history and utilizing a feedback mechanism. The heading (i.e. direction of travel) can be estimated by monitoring the angle that the device makes with respect to North, then correcting for device bias and drift.

At step 412, the device signal data, device sensor data, and other device data are jointly fused with the fingerprint location data gathered as depicted in FIG. 3 and the associated description above. The data fusion performed is described in greater detail below in connection with FIG. 5 and the associated description. In other embodiments, the joint fusion can be performed using a Bayesian filter, a Kalman filter, a Rodriguez filter, or any suitable method of jointly fusing input data.

In one embodiment, the positioning module 130 can take into account, for example and without limitation, the following factors:

Instantaneous inertial sensor measurements (i.e., heading and step length);

Short-term inertial sensor measurement history (i.e., within a specified time window);

Wi-Fi received signal strength measurements;

Bluetooth received signal strength measurements;

Barometer-based floor transition information;

Magnetic field measurements;

User's current destination;

Physical map constraints (e.g., door walls);

Environment landmarks;

Cellular signal strengths; and

GPS signals.

At step 414, a precise location for the device is derived based on the joint fusion of gathered data.

Figure 5:
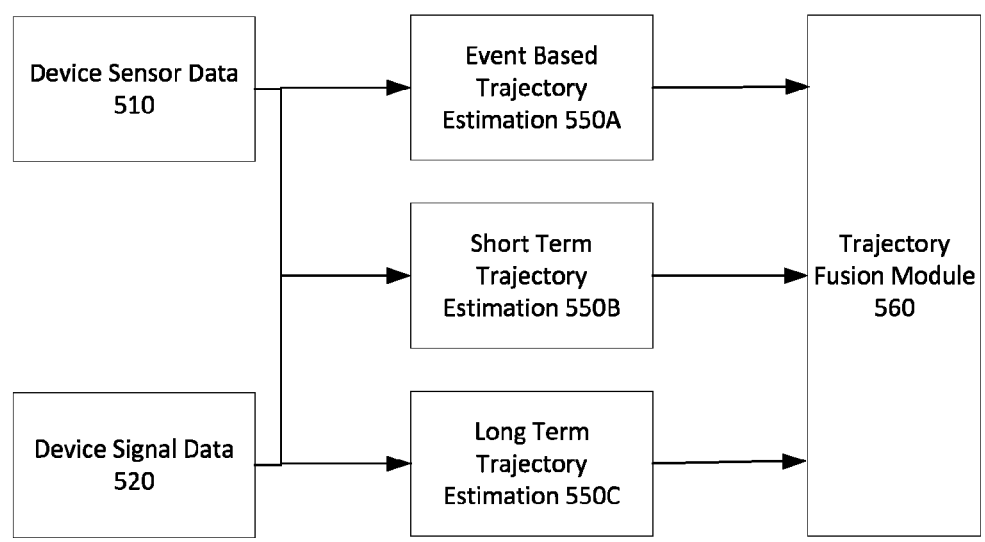
FIG. 5 is a block diagram depicting a joint fusion system according to an embodiment.

FIG. 5 depicts a block diagram of a joint fusion system 500, used for fusing gathered device data with previously obtained indoor space calibration data to derive a location of a device within the indoor space. Depicted are sensor data module 510 and signal data module 520, each of which can be implemented as a software module or an application running on a conventional or modern processor. Further depicted are trajectory estimation modules 550A-C, which receive the gathered sensor data of modules 510-520 as input. A trajectory fusion module is further provided, which receives as input the estimated trajectories produced by trajectory estimation modules 550A-C, and derives a final estimated location and trajectory.

Device sensor data module 510 is configured to gather sensor data from the device on which it is executing. For example, device sensor data can include accelerometer information, atmospheric pressure information, gyroscope information, magnetometer information and any other sensor data available to the device.

Device signal data module 520 is configured to gather signal data from the device on which it is executing. For example, device signal data can include Wi-Fi signals, Bluetooth signals, Cellular signals, and any other signal data available to and measurable by the device.

Trajectory estimation modules 550A-C take in as inputs the device signal data and device sensor data and estimate one or more potential locations and potential trajectories for the device based on those inputs. A trajectory is a set of locations ordered in time that can describe the movement of the device through the floor map. In one embodiment, an estimated trajectory can be described using the following formula:

$$f_i(t-\tau_i, t) = \mathrm{argmax}_{\vec{x}} \{ p(\vec{x} | \{z_j\}_{j \in (t-\tau_i, t)}, \vec{x}_t^*) \}$$

The parameter $\tau_i$ represents the update time interval and/or the minimum memory for the particular trajectory estimator and the parameter represents a location or set of locations (a trajectory), and $\vec{x}_t^*$ represents the location or trajectory at time t. For example, if the trajectory estimation module was operating in fixed time-mode, $\tau_i$ could represent a certain span of time (e.g. in seconds). Alternatively, if the trajectory estimation was based on an instantaneous event, $\tau_i$ could be equal to zero. The function p(A|B, C) represents the probability that event A occurs given events B and C occurred. In the above example, $\{z_j\}_{j \in (t-\tau_i, t)}$ represents the set of data observations or measurements in the time interval $(t-\tau_i, t)$.

Module 550A receives as input data measurements from modules 510 and 520 and performs trajectory estimation upon the occurrence of certain events, for example, based on the detection of a step, a floor change, or the detection of a landmark. Alternatively, module 550A can perform long-term event trajectory estimation based on detecting a change in a particular variable or the occurrence of a certain condition, for example, based on the detection of a sensor drift and bias.

Module 550B receives as input data measurements from modules 510 and 520 and performs short-term trajectory estimation. In one embodiment, module 550B performs a lightweight local optimization based on a relatively short update time. In one embodiment, module 550B updates trajectory estimates based on present and past information.

Module 550C receives as input data measurements from modules 510 and 520 and performs long-term trajectory estimation. In one embodiment, module 550C performs a lightweight local optimization based on a relatively long (compared to module 550B) update time. In one embodiment, module 550B updates trajectory estimates based on present, past, as well as future information.

Trajectory fusion module 550 takes in as input the estimated trajectories derived by trajectory estimation modules 550A-C and derives an estimated location for the device. In one embodiment, a general fusion of estimated trajectories can be described with the formula: $\vec{x}_t^* = g(\{f_i(t-\tau_i, t)\}_{i=1, \ldots, N})$, where g is a function which dynamically combines various trajectory estimates to provide the best estimate for the current trajectory and location of the user.

In one embodiment, trajectory fusion module 560 determines the estimated device location by a weighted average of the input trajectories. In other embodiments, trajectory fusion module 560 can determine the estimated device location by selecting the trajectory with the highest probability of being correct.

The disclosure has been described above with reference to specific embodiments. Various embodiments may be used in alone or in combination. Persons skilled in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

The invention claimed is:

1. A method of determining a position of a device within an indoor location, comprising:

gathering device signal data, the device signal data including at least one of Wi-Fi data, Bluetooth data, GPS data and cellular data;

gathering device sensor data from at least one of a set of device sensors including an accelerometer, a gyroscope and a magnetometer;

estimating a plurality of potential trajectories describing a movement of the device through the indoor location as a sequence of positions based on the device signal data, a fingerprint map calibrated for the indoor location, and by determining, from the device sensor data, a device direction of travel angle subject to a misalignment correction based on monitoring at least one of a device sensor drift and a device sensor bias factors, wherein the fingerprint map comprises a plurality of fingerprint locations, each of the plurality of fingerprint locations having at least one associated device signal data value or device sensor data value; and determining the position of the device based on a data fusion of the estimated plurality of potential trajectories, the data fusion based at least in part upon a probabilistic weighting for respective ones of the estimated plurality of potential trajectories.

2. The method of claim 1, wherein the estimating the plurality of potential trajectories comprises a lightweight local optimization.

3. The method of claim 1, wherein the fingerprint map is constructed by inferring the plurality of signal data values based on actual signal data values.

4. The method of claim 3, wherein the actual signal data values are recorded by a calibration module.

5. The method of claim 1, further comprising estimating a step length and a heading based on the device sensor data.

6. The method of claim 1, further comprising updating the fingerprint map with the position of the device.

7. The method of claim 1, further comprising orienting the device to the global coordinate system.

8. The method of claim 7, wherein the orienting the device to the global coordinate system is performed using a rotation matrix.

9. The method of claim 1, wherein the device signal data comprises a signal strength measurement value.

10. A system for determining a position of a device in an indoor location, the system comprising:
 a memory;
 a processor;
 a module that is stored in the memory and, when executed by the processor, determines the position of a device in an indoor location by performing the steps of: gathering device signal data, the device signal data including at least one of Wi-Fi data, Bluetooth data, GPS data and cellular data;
 gathering device sensor data from at least one of a set of device sensors including an accelerometer, a gyroscope and a magnetometer;
 estimating a plurality of potential trajectories describing a movement of the device through the indoor location as a sequence of positions based on the device signal data, a fingerprint map calibrated for the indoor location, and by determining, from the device sensor data, a device direction of travel angle subject to a misalignment correction based on monitoring at least one of a device sensor drift and a device sensor bias factors, wherein the fingerprint map comprises a plurality of fingerprint locations, each of the plurality of fingerprint locations having at least one associated device signal data value or device sensor data value; and
 determining the position of the device based on a data fusion of the estimated plurality of potential trajectories, the data fusion based at least in part upon a probabilistic weighting for respective ones of the estimated plurality of potential trajectories.

11. The system of claim 10, wherein the estimating the plurality of potential trajectories comprises a lightweight local optimization.

12. The system of claim 10, further comprising estimating a step length and a heading based on the device sensor data.

13. The system of claim 12, wherein the actual signal data values are recorded by a calibration module.

14. The system of claim 13, wherein the fingerprint map is constructed by inferring the plurality of signal data values based on actual signal data values.

15. The system of claim 10, wherein the device signal data comprises a signal strength measurement value.

16. A non-transitory computer-readable medium disposed in an audio device, the non-transitory computer-readable medium containing a set of instructions that causes a processor of a device to perform a process comprising:
 gathering device signal data, the device signal data including at least one of Wi-Fi data, Bluetooth data, GPS data and cellular data;
 gathering device sensor data from at least one of a set of device sensors including an accelerometer, a gyroscope and a magnetometer;
 estimating a plurality of potential trajectories describing a movement of the device through an indoor location as a sequence of positions from the device signal data, a fingerprint map calibrated for the indoor location, and by determining, from the device sensor data, a device direction of travel angle subject to a misalignment correction based on monitoring at least one of a device sensor drift and a device sensor bias factors, wherein the fingerprint map comprises a plurality of fingerprint locations, each of the plurality of fingerprint locations having at least one associated device signal data value or device sensor data value; and
 determining a position of the device relative to the indoor location based on a data fusion of the estimated plurality of potential trajectories, the data fusion based at least in part upon a probabilistic weighting for respective ones of the estimated plurality of potential trajectories.

* * * * *